INVENTOR.
Selwyne P. Kinney, Cornelius J. Garrigan,
Ward W. Clarke and Hugh B. Carr.
BY
Christy, Parmelee & Strickland
ATTYS.

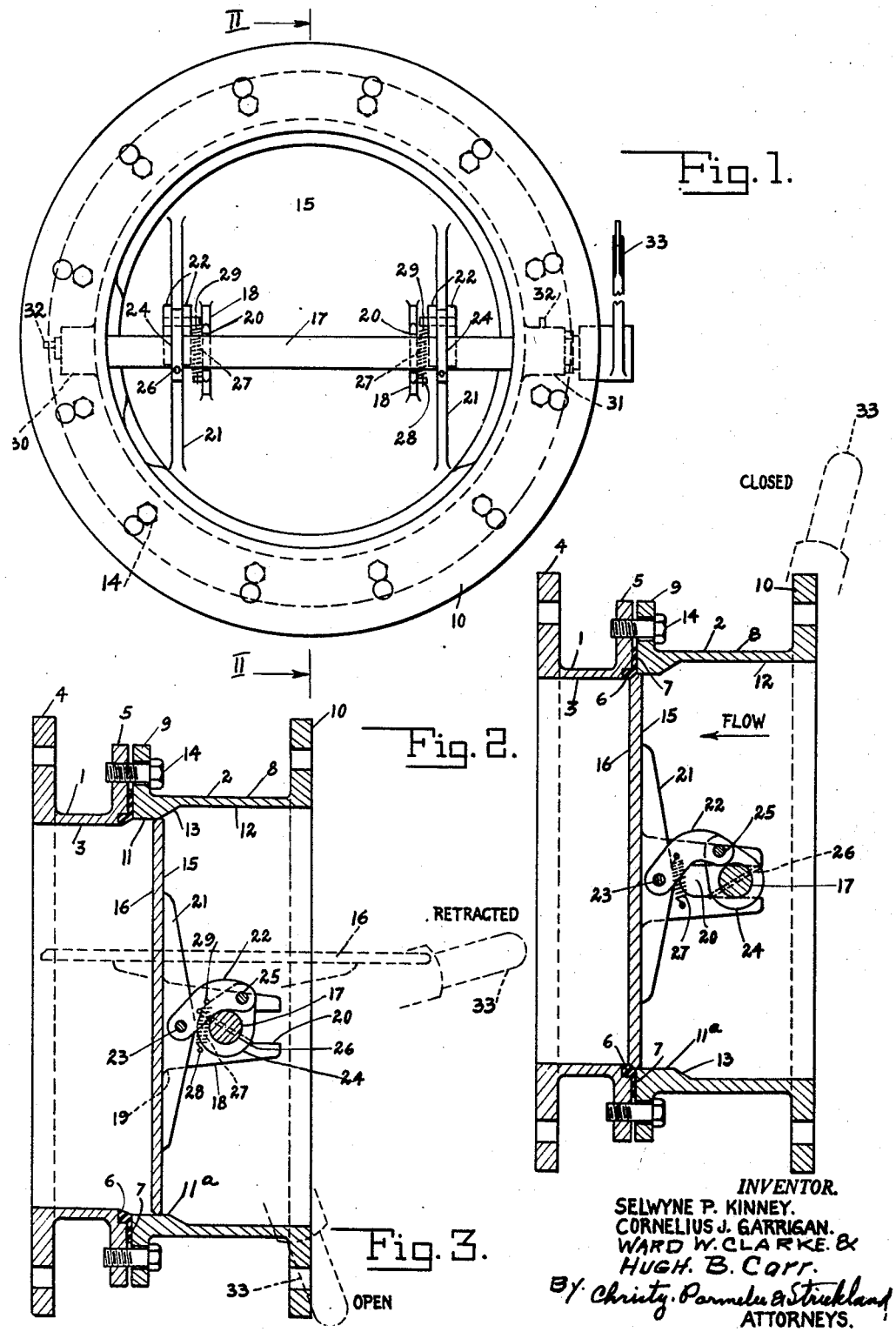

United States Patent Office 2,934,310
Patented Apr. 26, 1960

2,934,310

TIGHT CLOSING BUTTERFLY VALVE

Selwyne P. Kinney, Crafton, Cornelius J. Garrigan, Greentree Borough, and Ward W. Clarke and Hugh B. Carr, Pittsburgh, Pa., assignors to S. P. Kinney Engineers, Inc., Carnegie, Pa., a corporation of Pennsylvania Application November 2, 1955, Serial No. 544,394

9 Claims. (Cl. 251—163)

This invention relates to valves of the type known as butterfly valves, and is for an improvement in such valves in which the movable valve element may be effective to tightly close against a seat in the valve body.

Butterfly valves are used industrially in many places where it is desired to restrict or divert the flow of gas or fluid through a duct or apparatus, but they cannot be used in locations where the flow of fluid must be completely closed off. This is due to the fact that such a valve is like an ordinary stove pipe damper involving a circular disk or damper carried on a shaft extending diametrically across the interior of a circular pipe or housing. The valve element or damper rotates through an arc of 90° about the axis of the shaft from a position where it is transverse to the passageway or pipe in which it is located to a position where it lies parallel with the axis of the pipe. Since it must rotate within the pipe or passageway, its diameter must be slightly less than the interior diameter of the pipe or housing in which it is positioned. Hence, there can be no seat against which it makes a tight seal, as such a seat would interfere with the turning of the valve element or damper. Since the damper cannot close against a seat, such a valve cannot be fluid tight.

A primary object of the present invention is to provide a butterfly valve wherein the valve passage is provided with a seat against which the damper will tightly seat and to provide a damper and operating mechanism permitting the use of such a seat.

Further objects of the invention are to provide a butterfly valve with a replaceable seat, and to provide a novel operating means between the damper and valve shaft so as to move the valve element or damper rectilinearly in addition to rotating the same whereby it may thrust against the seat in closing the valve or be moved away from the seat upon opening of the valve a distance sufficient to clear the seat before the damper rotates to the full open position.

These and other objects and advantages are attained by our invention, which may be more fully understood in connection with the accompanying drawings which show certain embodiments of our invention, and in which:

Fig. 1 shows a rear elevation of the valve and damper operating mechanism;

Fig. 2 shows a cross section through the valve with the damper in sealing position;

Fig. 3 shows a view similar to Fig. 2 with the damper at the end of its straight linear movement ready for rotation into the position shown by dotted lines;

Figure 4:
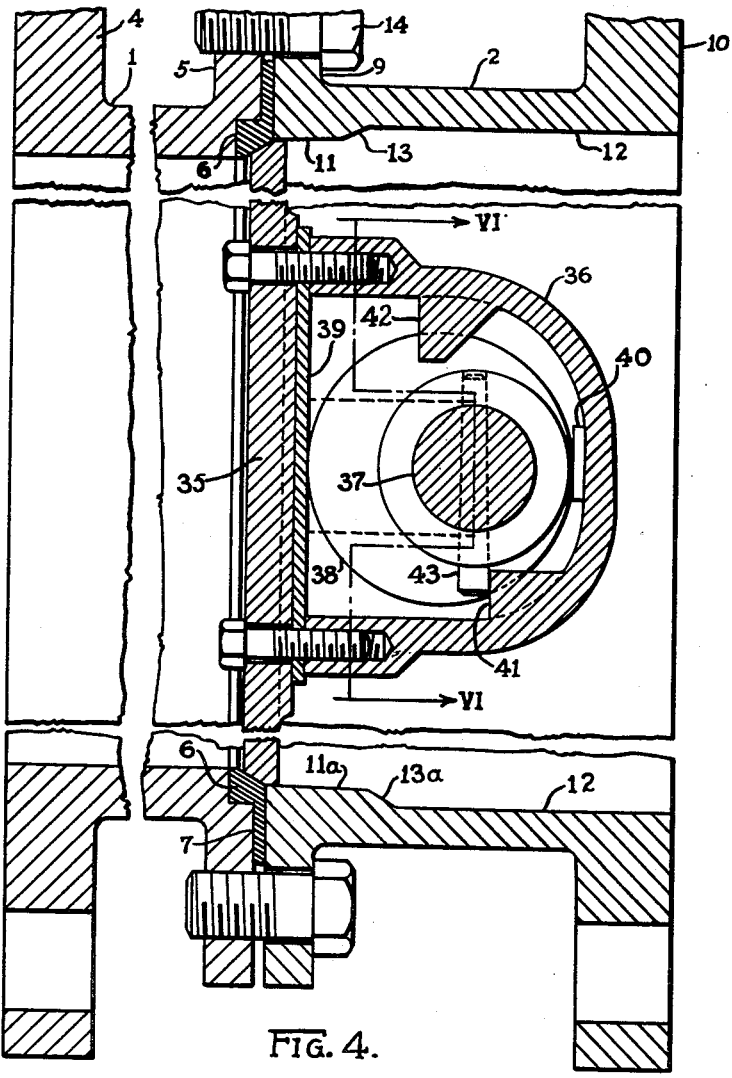
Fig. 4 shows a section similar to Fig. 2, but on a larger scale and showing a portion only of the entire valve body, this view shows a modification.

Referring now in detail to Figs. 1 to 3 of the drawings, the valve body is preferably comprised of two hollow cylindrical portions 1 and 2. The portion 1 having a web 3 terminating at its outer end in an outstanding flange 4 and at its inner end in an outstanding flange 5. The inner periphery of flange 5 has a recess therein to receive the head 6 of a circular sealing gasket which may be rubber and has a plate portion 7 extending between the adjacent flanges of the portions 1 and 2. The sealing gasket may be of rubber, rubber-like material, or metal such as brass or some composition, depending upon the use to which the valve is to be put. The gasket head 6 has an outwardly inclined or beveled edge forming a seat for the valve damper. The valve portion 2 comprises a web portion 8 terminating at its inner end in an outstanding flange 9 and at its outer end in an outstanding flange 10. The inner end portion 11 of the valve portion 2 has an inside diameter greater than that of valve portion 1 and the beveled face of gasket head 6 terminates in alignment therewith. The outer end portion 12 of valve portion 2 has an inside diameter greater than portion 11 to permit rotation of the valve damper as hereinafter described. The portions 11 and 12 are connected by a suitable portion 13. The adjacent flanges 5 and 9 have the gasket plate portion 7 disposed between them and are connected together by a plurality of bolts 14. The flanges 4 and 10 having a plurality of bolt openings therein for connection to the flanges of a pipe line or other conduit within which the valve is mounted.

The valve damper 15 is a flat circular member having a diameter slightly less than the inside diameter of the valve body web portion 11 and on its rear face 16 has a beveled peripheral portion corresponding to the bevel of the head portion 6 of the sealing gasket. A valve damper operating shaft 17 extends transversely of valve body portion 2 and through the walls of web portion 12 in spaced relation to damper 15. Guide members 18 are spaced longitudinally of shaft 17 and provided at one end with a portion 19 secured to damper 15 in any suitable manner. The opposite ends of members 18 are bifurcated as at 20 for slidably embracing shaft 17. A rib 21 is mounted on damper 15 adjacent each guide 18. A pair of link members 22 are pivotally mounted at one end on each rib 21 by means of pin 23. Cam members 24 are mounted on shaft 17 between the pairs of links 22 and pivotally connected thereto by pins 25. Each cam is suitably connected with shaft 17 in any suitable manner as by pins 26 for concurrent rotation therewith. A tension spring 27 is connected with each pair of links 22 and with the adjacent guide member 18 by any suitable means such as pin 28 in guide member 18 and pin 29 in link 22. The shaft 17 may be mounted on valve body member 2 in any suitable manner, as by having its end portions journaled in bearings 30 and 31 which may be cast integral with the member 2. Preferably these bearings are provided with lubricating fittings 32. The shaft 17 extends through bearing 31 and an operating handle 33 is mounted thereon for rotation of the shaft.

During operation of the valve, it may be mounted by means of flanges 4 and 10 in any suitable pipe line, stack or other form of conduit carrying the gas or gases to be controlled thereby. The valve damper in closed position is shown in Fig. 2 of the drawings wherein the damper 15 has its front face 16 seated in sealing position upon the seat 6 of the rubber gasket between the valve body portions 1 and 2. The flow of gases through the valve is in the direction of the arrow of Fig. 2 and any pressure thereof assists in holding the damper seated on its gasket 6. The valve handle 33 is first rotated into position marked "retracted" on Fig. 3 imparting rotation to shaft 17. During rotation of shaft 17 the cam 24 acting through links 22 imparts a linear movement to damper 15 relative to portion 11 of valve body 2 moving the damper from the position shown in Fig. 2 to that shown in full lines on Fig. 3. During this damper movement the guides 18 have a linear movement relative to shaft 17 disposed within the bifurcations 20 of the guides. When the damper is positioned as shown by full lines in Fig. 3, it is free to rotate relative to the valve body 2. By reason of shaft 17 being seated on the rear ends of the bifurcations 20 of guides 18, the cam 24 rotating concurrently with shaft 17 imparts a rotary movement to damper 15 as operating handle 33 is moved from "retracted" to "open" position as indicated on Fig. 3. When in fully open position damper is disposed at 90° to its closed position as shown by dotted lines in Fig. 3. During rotation of valve handle 33 from open to closed position, the damper 15 first rotates from the position shown by dotted lines in Fig. 3 to that shown by full lines, or from a horizontal to vertical position as viewed in Fig. 3. Further rotation of shaft 17 causes cam 24 acting through links 22 to move damper 15 linearly of valve portion 2 until the damper seats against gasket head 6 as the operating handle reaches "closed" position. During the latter linear movement of damper 15, springs 27 acting through links 22 position the damper within the valve body so as to seal against gasket head 6.

Figure 6:
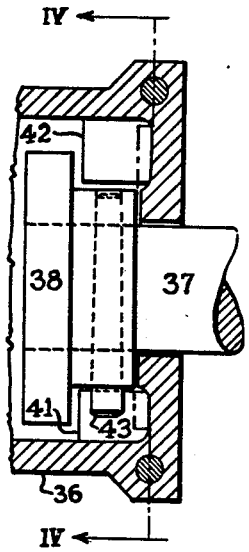
Fig. 6 is an elevation of a portion of the cam and housing shown in Fig. 5.
Figure 5:
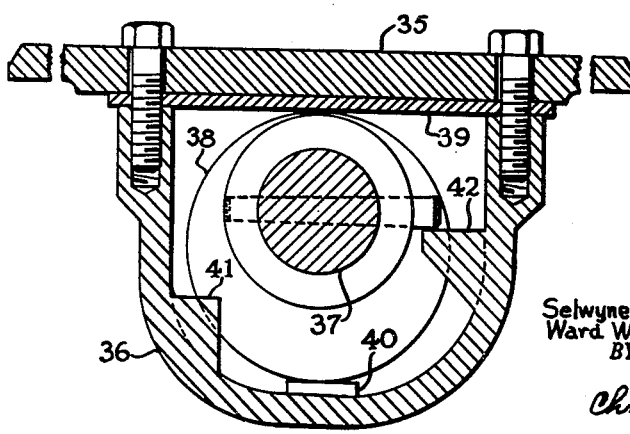
Fig. 5 is a fragmentary section of the mechanism of Fig. 4, but with the valve open.

In the construction shown in Figs. 4, 5 and 6 the valve body, seat and shaft are constructed as hereinbefore described, but we have shown a different eccentric arrangement for effecting rectilinear and swinging movement of the damper.

In these figures, the valve disk or damper 35 in closed position, as shown in Fig. 4, seats against the seat, designated 6. Instead of the damper having ribs and links at the back, it is provided with a cam housing 36 bolted thereto. The shaft 37, corresponding to 17 in Fig. 1, is provided with one or more eccentric cams 38 that are confined in the housing between a bearing plate 39 on the back of the valve and a bearing plate 40 in the housing.

To one side of the cam, the housing is provided with internal abutments 41 and 42. A pin 43 passing through the shaft has a projecting end which in closed position of the valve is near or adjacent the abutment 41. In the closed position, shown in Fig. 4, the high part of the cam 38 is pressing against the bearing plate 39, holding the damper against the seat. To open the valve, the shaft is rotated through an arc of 180° and as it does so it exerts pressure against the surface 40, retracting the valve damper rectilinearly away from the seat. When it has been thus withdrawn, it will clear the valve seat when it rotates to horizontal position. After the damper has been so withdrawn, the pin 43 contacts the abutment 42 and the damper is rotated to horizontal position, shown in Fig. 5.

When the damper is in horizontal position it cannot tilt back because of the contact of lug 42 with the pin, and the cam is so shaped that further clockwise movement tightens the engagement of the surface 40 against the cam. Therefore the damper cannot tilt out of position when it is opened, except by turning the shaft. When the shaft is turned counterclockwise, the damper will be tight enough against the cam to turn with it. When the damper is back in vertical position and contacts the surface 11a, the cam will turn in its housing and exert pressure against the plate 39 to move the damper 35 into tight seating position.

In each form shown, the area of guide surface 11 in the valve body is wider at the bottom than at the top, so that when the valve damper is vertical upon being moved to the closed position, it cannot swing in the reverse direction and must thereafter move rectilinearly.

Our invention, in providing a butterfly valve with a damper turning mechanism that imparts a rectilinear movement to the damper in the initial opening or final closing of the valve, enables an internal annular seat to be provided in the body and permits the valve damper to be shifted to a point wherein its turning movement the periphery of the damper clears the seat. It provides therefore a butterfly valve which is tight closing.

While we have shown and described certain embodiments of our invention, it will be understood that various changes and modifications may be made in the construction and arrangement of parts within the contemplation of our invention and within the scope of the appended claims.

We claim:

1. In a butterfly valve of the character described in combination, a hollow open ended housing having a longitudinally extending restricted portion therein having diametrically opposite portions of different linear dimension, a damper disposed transversely of said restricted portions and movable linearly thereof, a damper sealing member mounted adjacent one end of said restricted housing portion, a rotatable member disposed transversely of said housing outwardly of the opposite end of said housing restricted portion, and means connected with the damper and with the rotatable member for sequentially imparting reciprocal linear movement to the damper between said diametrically opposite housing restricted portions and rotary opening and closing movement to the damper after linear movement to the end of the shorter of said housing restricted portions adjacent said rotary member.

2. The butterfly valve as defined in claim 1 wherein the longer of the valve body restricted portions prevents rotation of the damper past a position substantially normal to said restricted portions as the valve moves from open position toward sealing position.

3. The valve as defined in claim 1, wherein said means comprise a housing secured to one face of the damper and extending therefrom outwardly from between said valve housing restricted portions, said housing receiving said rotatable member, a cam member fixed on said rotatable member and having diametrically opposite faces engaging said damper and said housing, and projecting portions on said rotatable member and said damper housing limiting relative rotation between said cam member and housing.

4. The valve as defined in claim 3 wherein said housing projecting portions are radially disposed about said rotatable member and said cam is disposed longitudinally of the rotatable member relative to said housing projecting portions.

5. The butterfly valve as in claim 1 wherein said means includes a guide member rigidly mounted on the damper in engagement with said rotatable member and selectively movable relative to the rotatable member as the damper moves into and out of sealing position.

6. The butterfly valve as in claim 5 wherein, a cam member is mounted on the rotatable member for rotation therewith, a link pivotally connects the cam and damper, and a resilient extensible member connects the link and guide for positioning the damper during return from open to sealing position.

7. The butterfly valve as in claim 6 wherein the link has a bearing engagement with said rotatable member when the damper is positioned for concurrent rotation with said rotatable member.

8. The butterfly valve as in claim 7 wherein the damper has peripheral engagement with the housing when in sealing position.

9. The butterfly valve as in claim 1 wherein the said means comprises a bracket mounted on the damper and extending in a direction towards the rotatable member, one end of the bracket having a bifurcated portion within which the rotatable member is disposed during all positions of the damper, a cam mounted on the rotatable member adjacent one side of the bracket and connected to the rotatable member for concurrent rotation therewith, a link member having one end pivotally connected to the cam in spaced relation to the rotatable member and the opposite end pivotally connected with the damper, and a tension spring connected at one end to the bracket and at the other end to the link intermediate the ends thereof.

References Cited in the file of this patent

UNITED STATES PATENTS

| | | |
|---|---|---|
| 373,000 | Zehren | Nov. 8, 1887 |
| 1,213,513 | Lohse | Jan. 23, 1917 |
| 1,504,288 | Vencl | Aug. 12, 1924 |
| 2,655,942 | Dougherty | Oct. 20, 1953 |
| 2,673,061 | Broz | Mar. 23, 1954 |

FOREIGN PATENTS

| | | |
|---|---|---|
| 496,005 | France | July 18, 1919 |
| 605,688 | France | Feb. 20, 1926 |
| 621,195 | Great Britain | Apr. 6, 1949 |